United States Patent
Jang et al.

(10) Patent No.: US 9,240,744 B2
(45) Date of Patent: Jan. 19, 2016

(54) METHODS, SYSTEMS AND APPARATUS FOR ADJUSTING CURRENT AND/OR TORQUE COMMANDS USED TO CONTROL OPERATION OF AN ASYNCHRONOUS MACHINE

(75) Inventors: Jihoon Jang, Torrance, CA (US); Bon Ho Bae, Torrance, CA (US); Silva Hiti, Redondo Beach, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 13/547,938

(22) Filed: Jul. 12, 2012

(65) Prior Publication Data

US 2014/0015468 A1    Jan. 16, 2014

(51) Int. Cl.
    *H02P 1/04*    (2006.01)
    *H02P 21/06*   (2006.01)

(52) U.S. Cl.
    CPC ............ *H02P 21/06* (2013.01); *H02P 2207/01* (2013.01)

(58) Field of Classification Search
    USPC ............... 318/400.19, 812, 567, 598, 798, 318/400.32, 473, 461, 727
    See application file for complete search history.

(56) References Cited

U.S. PATENT DOCUMENTS

| | | | |
|---|---|---|---|
| 6,366,043 B1* | 4/2002 | Stancu et al. | 318/432 |
| 2011/0084638 A1* | 4/2011 | Patel et al. | 318/400.32 |
| 2011/0163709 A1* | 7/2011 | Dai | H02P 21/06 318/812 |
| 2012/0303189 A1* | 11/2012 | Namuduri et al. | 701/22 |

FOREIGN PATENT DOCUMENTS

| | | |
|---|---|---|
| CN | 104045021 A | 5/2011 |
| CN | 102122914 A | 7/2011 |
| JP | 2009124876 A | 6/2009 |

OTHER PUBLICATIONS

De Doncker, R.; Novotny, D.W., "The Universal Field Oriented Controller", IEEE Transactions on Industry Applications, Jan./Feb. 1994, vol. 30, No. 1.

Jansen, P.; Lorenz, R.D., "A Physically Insightful Approach to the Design and Accuracy Assessment of Flux Observers for Field Oriented Induction Machine Drives", IEEE Transactions on Industry Applications, Jan./Feb. 1994, vol. 30, No. 1.

Chinese Patent and Trademark Office, Office Action for Chinese Patent Application No. 201310293401.6, mailed May 5, 2015.

\* cited by examiner

*Primary Examiner* — Shawki S Ismail
*Assistant Examiner* — Jorge L Carrasquillo
(74) *Attorney, Agent, or Firm* — Ingrassia Fisher & Lorenz, P.C.

(57) ABSTRACT

Embodiments of the present disclosure relate to methods, systems and apparatus for adjusting current and/or torque commands used to control operation of an asynchronous machine based on rotor flux of the asynchronous machine.

18 Claims, 8 Drawing Sheets

METHODS, SYSTEMS AND APPARATUS FOR ADJUSTING CURRENT AND/OR TORQUE COMMANDS USED TO CONTROL OPERATION OF AN ASYNCHRONOUS MACHINE

TECHNICAL FIELD

The technical field generally relates to techniques for controlling operation of multi-phase systems, and more particularly relates to methods, systems and apparatus for adjusting current and/or torque commands used to control operation of an asynchronous machine.

BACKGROUND

Electric machines are utilized in a wide variety of applications. For example, hybrid/electric vehicles (HEVs) typically include an electric traction drive system that includes an alternating current (AC) electric machine which is driven by a power converter with a direct current (DC) power source, such as a storage battery. Machine windings of the AC electric machine can be coupled to inverter sub-modules of an inverter module. Each inverter sub-module includes a pair of switches that switch in a complementary manner to perform a rapid switching function to convert the DC power to AC power. This AC power drives the AC electric machine, which in turn drives a shaft of the HEV's drivetrain.

In many systems, the inverter modules are driven by switching vector signals that are generated based on voltage command signals. The voltage command signals are generated based on current command signals that are provided from a torque-to-current mapping module. In such systems, the torque-to-current mapping module receives a torque command signal (Te*), an angular rotation speed ($\omega$r) of the machine, and a DC input voltage ($V_{DC}$) as inputs, and maps these inputs to current commands that will ideally cause the machine to generate the commanded torque (Te*) at a given machine speed ($\omega$r).

In controlling torque of an asynchronous machine (e.g., induction machine), it can be difficult to achieve high machine efficiency and a fast torque response. This is due, in part, to the inherent lagging characteristics of the rotor flux with respect to the stator current.

To improve machine efficiency, one conventional approach is to set current command slew rates to relatively lower values than would be used in comparison to current command slew rates that are used to control synchronous machines (e.g., permanent-magnet machines). However, setting slew rates to lower values can prevent a fast torque response, which is desirable in many induction machines. One way to do achieve a faster torque response is to maintain the rotor flux at a constant value above a certain level. However, this approach can reduce machine and/or inverter efficiency since it is necessary to maintain a certain level of current through the machine/inverter.

It would be desirable to provide improved methods, systems and apparatus for generating torque commands and/or current commands used to control an asynchronous machine such as an induction machine. It would also be desirable if such methods, systems and apparatus can provide a fast torque response while achieving acceptable levels of efficiency. Other desirable features and characteristics of the disclosed embodiments will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of an asynchronous machine. In accordance with one of the disclosed embodiments, a method is provided that is performed at a controller for controlling an asynchronous machine. The controller can determine a "monitored" rotor flux feedback of the asynchronous machine, and based on the rotor flux feedback, can generate one or more control signals, that control one or more slew rates that are used to generate final current commands. Depending on the implementation, the rotor flux feedback can be measured or estimated (e.g., measured using a flux sensor, or estimated using a flux estimator module), and in some implementations can be, for example, a d-axis rotor flux or a magnitude of the rotor flux feedback.

In one embodiment, the control signals can include a first control signal and/or a second control signal, and the one or more slew rates comprise a torque slew rate and/or a current slew rate. In one embodiment, the first control signal dynamically adjusts the torque slew rate, and the second control signal dynamically adjusts the current slew rate independently of the torque slew rate such that the torque and current slew rates have different values. In one embodiment, the first control signal can be generated by initially setting the torque slew rate to a slow torque slew rate value via the first control signal. A value of a rotor flux ratio can then be computed, and it can be determined whether the value of the rotor flux ratio is greater than a high threshold value. In one embodiment, the rotor flux ratio is a ratio of the rotor flux feedback to a rotor flux command. In one embodiment, the rotor flux command is determined from a lookup table that maps torque command values to corresponding rotor flux command values. When the value of the rotor flux ratio is determined to be greater than or equal to the high threshold value, the torque slew rate can be set to a faster torque slew rate value via the first control signal. By contrast, when the value of the rotor flux ratio is determined to be less than the high threshold value, it can be determined whether the value of the rotor flux ratio is less than a low threshold value, and if so, the torque slew rate can be set to the slow torque slew rate value via the first control signal.

Similarly, in another embodiment, the second control signal can be generated by initially setting the current slew rate to a slow current slew rate value via the second control signal, and a value of the rotor flux ratio can be computed. It can then be determined whether the value of the rotor flux ratio is greater than another high threshold value, which can be different than the high threshold value used to generate the first control signal. When the value of the rotor flux ratio is determined to be greater than or equal to the other high threshold value, the current slew rate can be set to a faster current slew rate value via the second control signal. When the value of the rotor flux ratio is determined to be less than the other high threshold value, it can be determined whether the value of the rotor flux ratio is less than another low threshold value, which can be different than the low threshold value used to generate the first control signal. When the value of the rotor flux ratio is determined to be less than the other low threshold value, the current slew rate can be set to the slow current slew rate value via the second control signal.

In one embodiment, a limited torque command is provided that is used to generate a limited torque command output signal based on the first control signal such that the slew rate of the limited torque command output signal is adjusted based on the first control signal. Based on the limited torque command output signal, a DC input voltage, and an angular rotation speed, initial current commands can be generated, which can then be processed further to generate limited current commands (e.g., the limited current commands are equal to the initial current commands unless the initial current commands exceed maximum values that are permitted, in which case the limited current commands can be limited to maximum values). The final current commands can then be generated based on the second control signal and the limited current commands such that the slew rate of the final current commands is adjusted based on the second control signal.

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

Figure 1:
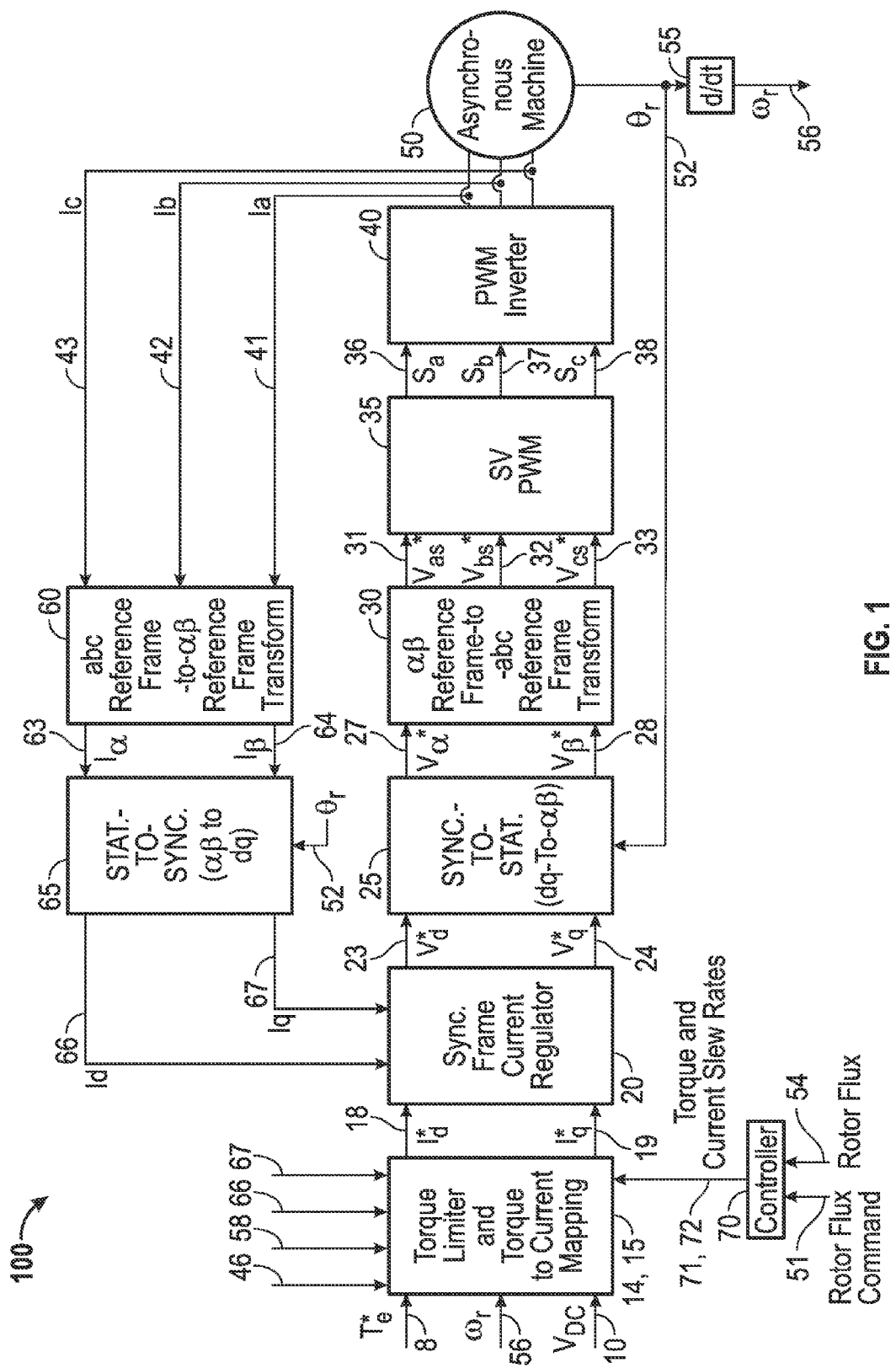
FIG. 1 is a block diagram of one example of a motor drive system in accordance with some of the disclosed embodiments.

As used herein, the word "exemplary" means "serving as an example, instance, or illustration." The following detailed description is merely exemplary in nature and is not intended to limit the disclosed embodiments or the application and uses of the disclosed embodiments. Any embodiment described herein as "exemplary" is not necessarily to be construed as preferred or advantageous over other embodiments. All of the embodiments described in this Detailed Description are exemplary embodiments provided to enable persons skilled in the art to make or use the disclosed embodiments and not to limit the scope of the disclosed embodiments which is defined by the claims. Furthermore, there is no intention to be bound by any expressed or implied theory presented in the preceding technical field, background, brief summary or the following detailed description.

Before describing some of the various embodiments in detail, it should be observed that the embodiments reside primarily in combinations of method steps and apparatus components related to generating current commands used for controlling operation of a multi-phase system. It will be appreciated that embodiments described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments described herein may be comprised of one or more conventional processors and unique stored program instructions that control the one or more processors to implement, in conjunction with certain non-processor circuits, some, most, or all of the functions for generating current commands used for controlling operation of a multi-phase system, as described herein. As such, these functions may be interpreted as steps of a method for generating current commands used for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

The disclosed embodiments relate to methods, systems and apparatus for generating current commands used for controlling operation of an induction machine used in a multi-phase system. In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to generate current commands used for controlling operation of an induction machine used in a multi-phase system. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to a device or apparatus that converts electrical energy to mechanical energy or vice versa. AC machines can generally be classified into synchronous AC machines and asynchronous AC machines. Synchronous AC machines can include permanent magnet machines (e.g., surface mount permanent magnet machines (SMPMMs) and interior permanent magnet machines (IPMMs)) and reluctance machines. By contrast, asynchronous AC machines include induction machines.

Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a vector controlled motor drive system 100 in accordance with the disclosed embodiments. The system 100 controls a three-phase AC machine 50 via a three-phase pulse width modulated (PWM) inverter module 40 coupled to the three-phase AC machine 50 so that the three-phase AC machine 50 can efficiently use a DC input voltage (VDC) 10 provided to the three-phase PWM inverter module 40 by adjusting current commands that control the three-phase AC machine 50. In one particular implementation, the vector controlled motor drive system 100 can be used to control torque in an HEV.

In the following description of one particular non-limiting implementation, the three-phase AC machine 50 is embodied as a three-phase asynchronous AC powered machine 50, and in particular a three-phase AC powered induction machine; however, it should be appreciated that the illustrated embodiment is only one non-limiting example of the types of AC machines that the disclosed embodiments can be applied to, and further that the disclosed embodiments can be applied to any type of multi-phase asynchronous AC powered machine that includes fewer or more phases.

The three-phase AC motor 50 is coupled to the three-phase PWM inverter module 40 via three inverter poles and generates mechanical power (Torque×Speed) based on three-phase sinusoidal current signals 41 . . . 43 received from the PWM inverter module 40. In some implementations, the angular position 52 of a rotor (θr) of the three-phase AC motor 50 or "shaft position" is measured using a position sensor (not illustrated), and in other implementations, the angular position 52 of a rotor (θr) of the three-phase AC motor 50 can be estimated without using a position sensor by using sensorless position estimation techniques.

The vector control motor drive system 100 includes a torque-to-current mapping module 15, a synchronous (SYNC.) frame current regulator module 20, a synchronous-to-stationary (SYNC.-TO-STAT.) transformation module 25, an αβ reference frame-to-abc reference frame (αβ-to-abc) transformation module 30, a pulse width modulation (PWM) module 35, a three-phase PWM inverter 40, an abc reference frame-to-αβ reference frame (abc-to-αβ) transformation module 60, a stationary-to-synchronous (STAT.-TO-SYNC.) transformation module 65, and a controller 70.

The torque-to-current mapping module 15 receives a torque command input signal (Te*) 8, angular rotation speed (ωr) 56 of the shaft that is generated at block 55 based on the derivative of the rotor/shaft position output (θr) 52, and a DC input voltage (VDC) 10 as inputs, along with possibly a variety of other system parameters depending upon implementation. The torque-to-current mapping module 15 uses these inputs to generate a d-axis current command (Id*) 18 and a q-axis current command (Iq*) 19 that will cause the induction machine 50 to generate the commanded torque (Te*) at speed (ωr) 56. In particular, the torque-to-current mapping module 15 uses the inputs to map the torque command input signal (Te*) 8 to a d-axis current command signal (Id*) 18 and a q-axis current command signal (Iq*) 19. The synchronous reference frame d-axis and q-axis current command signals (Id*, Iq*) 18, 19 are DC commands that have a constant value as a function of time at steady state when the commanded torque (Te*), the angular rotation speed (ωr) 56, and the DC input voltage (VDC) 10 are constant.

As will be explained below, in accordance with one implementation of the disclosed embodiments, based on inputs 51, 54, the controller 70 generates control signals 71, 72 that are used to dynamically adjust respective values of torque and current slew rates that will be applied at the torque-to-current mapping module 15.

The abc-to-αβ transformation module 60 receives the measured three-phase stationary reference frame feedback stator currents (Ia . . . Ic) 41-43 that are feedback from induction machine 50. The abc-to-αβ transformation module 60 uses these three-phase stationary reference frame feedback stator currents 41-43 to perform an abc reference frame-to-αβ reference frame transformation to transform the three-phase stationary reference frame feedback stator currents 41-43 into stationary reference frame feedback stator currents (Iα, Iβ) 63, 64. The abc-to-αβ transformation is well-known in the art and for sake of brevity will not be described in detail.

The stationary-to-synchronous transformation module 65 receives the stationary reference frame feedback stator currents (Iα, Iβ) 63, 64 and the rotor angular position (θr) 52 and generates (e.g., processes or converts) these stationary reference frame feedback stator currents (Iα, Iβ) 63, 64 to generate a synchronous reference frame d-axis current signal (Id) 66 and a synchronous reference frame q-axis current signal (Iq) 67. The process of stationary-to-synchronous conversion is well-known in the art and for sake of brevity will not be described in detail.

The synchronous frame current regulator module 20 receives the synchronous reference frame d-axis current signal (Id) 66, the synchronous reference frame q-axis current signal (Iq) 67, the d-axis current command (Id*) 18 and the q-axis current command (Iq*) 19, and uses these signals to generate a synchronous reference frame d-axis voltage command signal (Vd*) 23 and a synchronous reference frame q-axis voltage command signal (Vq*) 24. The synchronous reference frame voltage command signals (Vd*, Vq*) 23, 24 are DC commands that have a constant value as a function of time for steady state operation when the commanded torque (Te*), the rotor angular velocity (ωr) 56, and the DC input voltage (VDC) 10 are constant. The process of current to voltage conversion can be implemented as a Proportional-Integral (PI) controller, which is known in the art and for sake of brevity will not be described in detail. Because the current commands are DC signals (at steady state) in the synchronous reference frame they are easier to regulate in comparison to AC stationary reference frame current commands.

The synchronous-to-stationary transformation module 25 receives the synchronous reference frame d-axis voltage command signal (Vd*) 23 and the synchronous reference frame q-axis voltage command signal (Vq*) 24 as inputs along with the rotor position output (θr) 52, and performs a dq-to-αβ transformation to generate an α-axis stationary reference frame voltage command signal (Vα*) 27 and a β-axis stationary reference frame voltage command signal (Vβ*) 28. The stationary reference frame α-axis and β-axis voltage command signals (Vα*, Vβ*) 27, 28 are in the stationary reference frame and therefore have values that vary as a sine wave as a function of time. The process of synchronous-to-stationary conversion is well-known in the art and for sake of brevity will not be described in detail.

The αβ-to-abc transformation module 30 receives the stationary reference frame voltage command signals (Vα*, Vβ*) 27, 28, and based on these signals, generates stationary reference frame voltage command signals (Vas* ... Vcs*) 31, 32, 33 (also referred to as "phase voltage command signals") that are sent to the PWM module 35. The αβ-to-abc transformation is well-known in the art and for sake of brevity will not be described in detail.

The three-phase PWM inverter module 40 is coupled to the PWM module 35. The PWM module 35 is used for the control of PWM of the phase voltage command signals (Vas* ... Vcs*) 31, 32, 33. The switching vector signals (Sa ... Sc) 36, 37, 38 are generated based on duty cycle waveforms that are not illustrated in FIG. 1, but are instead internally generated at the PWM module 35 to have a particular duty cycle during each PWM period. The PWM module 35 modifies the phase voltage command signals (Vas* ... Vcs*) 31, 32, 33 based on the duty cycle waveforms (not illustrated in FIG. 1) to generate switching vector signals (Sa ... Sc) 36, 37, 38, which it provides to the three-phase PWM inverter module 40. The particular modulation algorithm implemented in the PWM module 35 can be any known modulation algorithm including Space Vector Pulse Width Modulation (SVPWM) techniques to control of pulse width modulation (PWM) to create alternating current (AC) waveforms that drive the three-phase AC powered machine 50 at varying speeds based on the DC input 10.

The switching vector signals (Sa ... Sc) 36, 37, 38 control the switching states of switches in PWM inverter 40 to generate three-phase voltage commands at each phase A, B, C. The switching vector signals (Sa ... Sc) 36, 37, 38 are PWM waveforms that have a particular duty cycle during each PWM period that is determined by the duty cycle waveforms that are internally generated at the PWM module 35.

The three-phase PWM inverter module 40 receives the DC input voltage (VDC) and switching vector signals (Sa ... Sc) 36, 37, 38, and uses them to generate three-phase alternating current (AC) voltage signal waveforms at inverter poles that drive the three-phase AC machine 50 at varying speeds (ωr) 56.

The three-phase machine 50 receives the three-phase voltage signals generated by the PWM inverter 40 and generates a motor output at the commanded torque Te* 8.

Although not illustrated in FIG. 1, the system 100 may also include a gear coupled to and driven by a shaft of the three-phase AC machine 50. The measured feedback stator currents (Ia-Ic) 41-43 are sensed, sampled and provided to the abc-to-αβ transformation module 60 as described above.

In accordance with the disclosed embodiments, methods, systems and apparatus are provided for generating torque commands and/or current commands used to control an asynchronous machine, such as an induction machine, that can provide a fast torque response while achieving acceptable levels of efficiency.

As will be explained below, a fast torque response can be achieved by dynamically changing one or more slew rates to dynamically adjust the rate of change of torque commands and/or current commands based on rotor flux (e.g., measured or estimated rotor flux). In one implementation, a flux estimator can be used to monitor rotor flux. When the rotor flux feedback is higher than a predetermined value, and slew rates of torque commands and/or current commands can be set to relatively high values, and when the rotor flux feedback falls lower than a threshold value, the slew rates of torque commands and/or current commands can be reset to relatively low values. This allows the slew rates of the torque commands and/or the current commands to be adjusted based on rotor flux to achieve improved torque control (e.g., faster torque response).

For example, dynamically adjusting the slew rates of the torque commands and/or current commands (so that they are set to the fastest one) can make it possible to achieve proper torque responses in situations where a fast torque response is desirable without impacting other control performance parameters such as the transient state oscillation in torque/current responses.

Figure 2A:
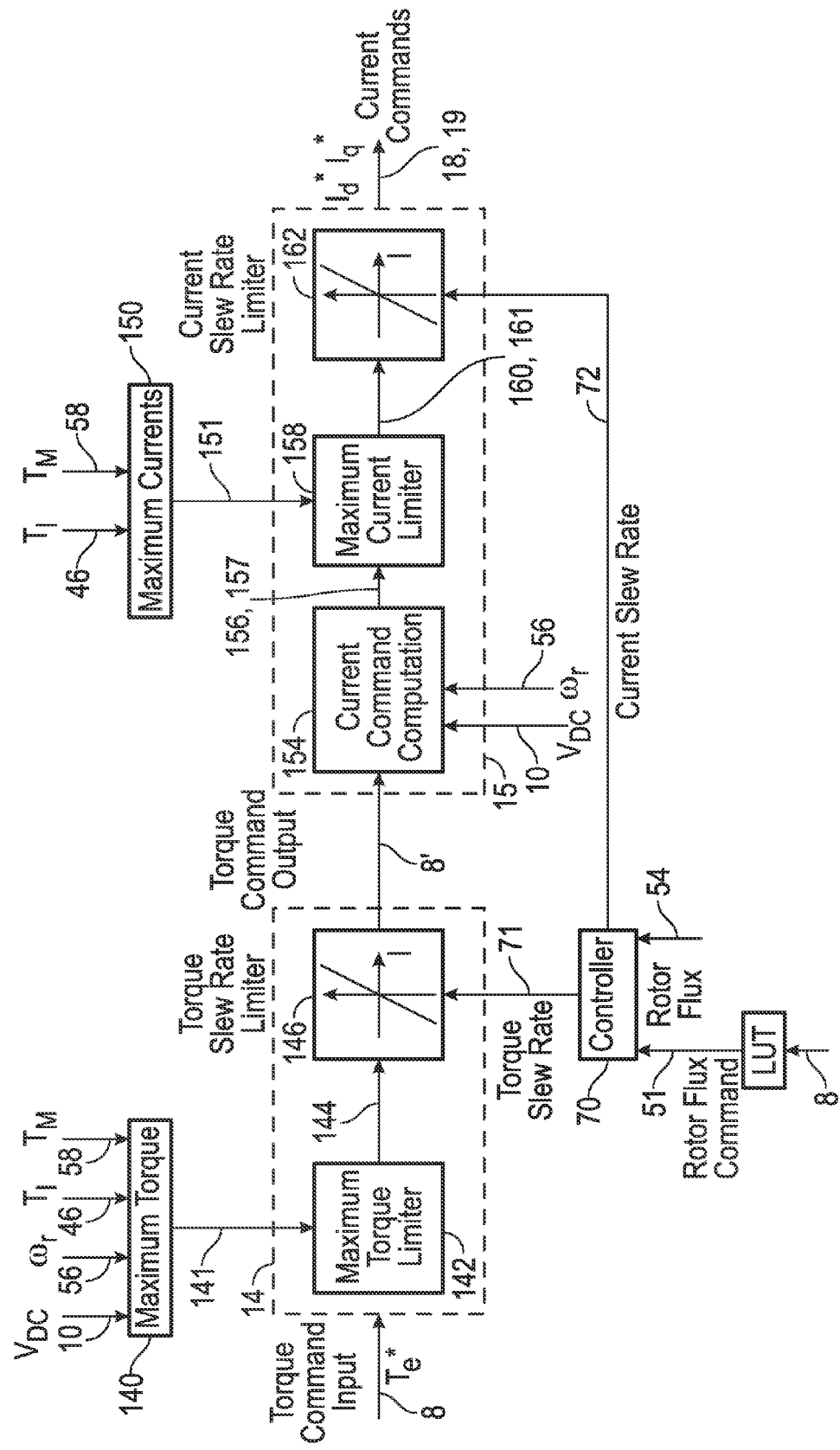
FIG. 2A is a block diagram of a torque-to-current mapping module in accordance with some of the disclosed embodiments.

FIG. 2A is a block diagram of a torque limiter module 14 and a torque-to-current mapping module 15 in accordance with one exemplary implementation of some of the disclosed embodiments.

The torque limiter module 14 includes a maximum torque limiter module 142 and a torque slew rate limiter module 146. The torque-to-current mapping module 15 includes a current command computation module 154, a maximum current limiter module 158, and a current slew rate limiter module 162.

The maximum torque limiter module 142 receives the torque command input signal (Te*) 8, and a maximum torque input 141 from a maximum torque computation module 140 (that can be implemented at high level controller (not illustrated)), and processes these inputs to generate a limited torque command 144 that is provided to the torque slew rate limiter module 146. The maximum torque input 141 represents the maximum torque that is permitted, and can be generated, in one embodiment, as will be described below with reference to FIG. 2B.

In one embodiment, the maximum torque limiter module 142 selects the one of the torque command input signal (Te*) 8 and the maximum torque input 141 that has the lower absolute value and outputs it as the limited torque command 144. To explain further, in one embodiment, the maximum torque limiter module 142 limits the torque command input signal (Te*) 8 to a maximum value such that the torque command input signal (Te*) 8 is limited to (or "capped at") a value that is limited to the maximum torque input 141. As such, when the torque command input signal (Te*) 8 exceeds a maximum value (specified by the maximum torque input 141), the torque command input signal (Te*) 8 is limited to the value of the maximum torque input 141. By contrast, when the torque command input signal (Te*) 8 less than or equal to the maximum value (specified by the maximum torque input 141), the torque command input signal (Te*) 8 is output (without modification) by the maximum torque limiter module 142 as the limited torque command 144.

As will be explained below, in accordance with the disclosed embodiments, the controller 70 generates the control signals 71, 72 that dynamically adjust the respective slew rates that are applied at the torque slew rate limiter module 146 and/or at the current slew rate limiter module 162. In this embodiment, the controller 70 generates the control signals 71, 72 depending on a value of a rotor flux ratio in comparison to thresholds. The rotor flux ratio is computed based on a rotor flux command 51 and a rotor flux feedback 54 of the induction machine 50.

In one embodiment, the rotor flux command 51 is determined from a lookup table that maps torque command values to a rotor flux command values. To explain further, there are infinite number of rotor flux commands can achieve one value of the torque command (e.g., different values of the rotor flux command will cause different magnitudes of the current). There is only one rotor flux command value that can achieve the highest system (motor/inverter) efficiency. In one implementation, the lookup table can be generated using the rotor flux command values that achieve highest system efficiencies for each value of the torque command.

The rotor flux feedback 54 of the induction machine 50 can be either a measured value or an estimated value depending on the implementation. In one implementation, the rotor flux feedback 54 can be measured using any known flux sensor, and in another implementation, the rotor flux feedback 54 can be estimated using a flux estimator module that implements any known techniques and technologies for estimating rotor flux. One example of a flux estimator module is disclosed in Jansen, P. L., & Lorenz, R. D. (1994). Physically Insightful Approach To The Design And Accuracy Assessment Of Flux Observers For Field Oriented Induction Machine Drives. IEEE Transactions On Industry Applications, 30(1), 101-110. In one embodiment, the rotor flux feedback 54 can be the d-axis rotor flux. In another embodiment, the rotor flux feedback 54 can be the magnitude of the rotor flux. As will be explained below, in accordance with the disclosed embodiments, the rotor flux feedback 54 is used along with a rotor flux command 51 to compute a rotor flux ratio (RFR) that can then be used to dynamically (and automatically) change one or more slew rate(s) that is/are applied at a torque slew rate limiter module 146 and/or at a current slew rate limiter module 162.

The torque slew rate limiter module 146 receives control signal 71 and the limited torque command 144 and processes these inputs to generate a limited torque command output signal (Te*') 8'. As will be described below, in one embodiment, the torque slew rate limiter module 146 dynamically adjusts the slew rate of the limited torque command 144 in response to a control signal 71.

The current command computation module 154 receives the limited torque command output signal (Te*') 8', the DC input voltage (VDC) 10, and the angular rotation speed ($\omega r$) 56, and processes these inputs to generate initial d-axis and q-axis current commands 156, 157 that are provided to the maximum current limiter module 158. The current command computation module 154 can be any know module that can generate the initial d-axis and q-axis current commands 156, 157 based on limited torque command output signal (Te*') 8'. To explain further, in one embodiment, the current command computation module 154 can be implemented using a set of a look-up tables that receive the limited torque command output signal (Te*') 8', the DC input voltage (VDC) 10, and the angular rotation speed ($\omega r$) 56, as inputs, and maps these inputs to initial d-axis and q-axis current commands 156, 157.

The maximum current input 151 can be provided from a maximum current computation module 150 that can be implemented, for example, at high level controller (not illustrated). The maximum current input 151 represents the maximum allowable current that is permitted to flow from the inverter to the machine. In one embodiment, the maximum current input 151 can be generated based on a measured inverter temperature ($T_I$) 46 and a measured machine temperature ($T_M$) 58. In one particular embodiment, the maximum current input 151 can be selected as the minimum value of an inverter current limit 264, and a machine current limit 274. One implementation of the maximum current computation module 150 will be described below with reference to FIG. 2C.

The maximum current limiter module 158 receives the maximum current input(s) 151 along with the initial d-axis and q-axis current commands 156, 157, and processes these inputs to generate limited d-axis and q-axis current commands 160, 161 that are provided to the current slew rate limiter module 162. Depending on the implementation, the maximum current input(s) 151 can be two separate d-axis and q-axis maximum current input signals, or can be a single maximum current input signal.

To explain further, in one embodiment, when the maximum current input(s) 151 are two separate d-axis and q-axis maximum current input signals, the maximum current limiter module 158 limits the initial d-axis and q-axis current commands 156, 157 to maximum values such that they are limited to (or "capped at") values that are specified by their corresponding d-axis and q-axis maximum current input signals 151. In one embodiment, the maximum current limiter module 158 selects the ones of the initial d-axis and q-axis current commands 156, 157 and the maximum current input(s) 151 that have the lower absolute value and outputs the selected signals as the limited d-axis and q-axis current commands 160, 161. The maximum current limiter module 158 selects the minimum value between the initial d-axis current command 156 and the d-axis component of the maximum current input signal 151. However, because the initial q-axis current command 157 can be positive or negative, the maximum current limiter module 158 selects the minimum absolute value between the initial q-axis current command 157 and q-axis component of the maximum current input signal 151. This way, the maximum current limiter module 158 limits the initial d-axis and q-axis current commands 156, 157 to the maximum values of their corresponding d-axis and q-axis maximum current input signals 151 if either one exceeds their corresponding d-axis and q-axis maximum current input signal 151. As such, when either one of the initial d-axis and q-axis current commands 156, 157 exceeds a maximum value (specified by their corresponding d-axis and q-axis maximum current input signal 151), the initial d-axis and q-axis current commands 156, 157 are limited to the value of their corresponding d-axis and q-axis maximum current input signal 151. By contrast, when the initial d-axis and q-axis current commands 156, 157 are less than or equal to the maximum value (specified by their corresponding d-axis and q-axis maximum current input signal 151), the initial d-axis and q-axis current commands 156, 157 are output (without modification) by the maximum current limiter module 158 as the limited d-axis and q-axis current commands 160, 161.

By contrast, in another embodiment, when the maximum current input 151 is a single maximum current input signal and the commands 156, 157 need to be limited, the maximum current limiter module 158 can compute a magnitude of the initial d-axis and q-axis current commands 156, 157, then compute a ratio of the maximum current input 151 to the magnitude, and then separately multiply each of the initial d-axis and q-axis current commands 156, 157 by the ratio to generate the limited d-axis and q-axis current commands 160, 161. This way the initial d-axis and q-axis current commands 156, 157 are limited to (or "capped at") values that are specified by single maximum current input signal 151. Alternatively, in still another embodiment, the maximum current limiter module 158 can set the limited d-axis current command 160 equal to the initial d-axis current command 156, and then compute the limited q-axis current command 161 as being equal to the square root of: (the maximum current input $151^2$—the initial d-axis current command $156^2$).

The current slew rate limiter module 162 receives control signal 72 and the limited current commands 160, 161, and processes these inputs to generate the d-axis current command (Id*) 18 and the q-axis current command (Iq*) 19 that are provided to the 20 and then processed as described above. As will be described below with reference to FIG. 3, in one embodiment, the current slew rate limiter module 162 dynamically adjusts the slew rate of the limited current commands 160, 161 in response to the control signal 72.

Figure 2B:
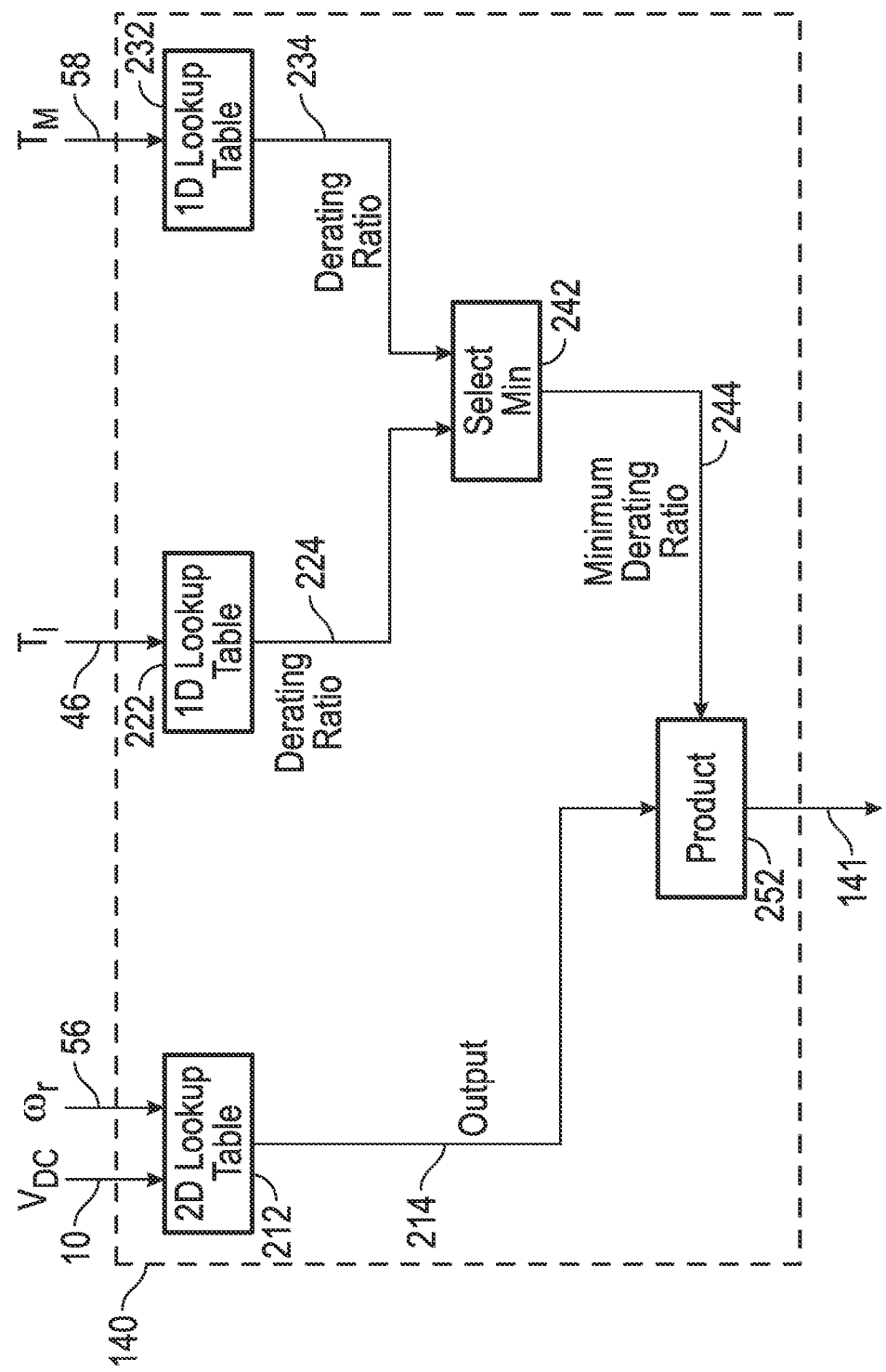
FIG. 2B is a block diagram of a maximum torque computation module in accordance with one exemplary implementation of some of the disclosed embodiments.

FIG. 2B is a block diagram of a maximum torque computation module 140 in accordance with one exemplary implementation of some of the disclosed embodiments. The maximum torque computation module 140 includes a set of two-dimensional look-up tables 212, two sets of one-dimensional look-up tables 222, 232, and modules 242, 252 that can be used generate the maximum torque input 141. The set of two-dimensional look-up tables 212 are used to generate an output 214 in response to values of the DC input voltage (VDC) 10 and the angular rotation speed ($\omega r$) 56 that are inputs to the set of two-dimensional look-up tables 212. Although not illustrated in FIG. 1, temperature sensors can be disposed in and/or around the inverter module 40 and the machine 50, and used to measure temperatures of those modules to generate a measured inverter temperature ($T_I$) 46 and a measured machine temperature ($T_M$) 58. As illustrated in FIG. 2B, the inverter temperature ($T_I$) 46 can be an input to a one-dimensional look-up table 222 that outputs a derating ratio 224, and the machine temperature ($T_M$) 58 can be an input to another one-dimensional look-up table 232 that outputs another derating ratio 234. Module 242 selects and outputs a minimum value 244 of the two derating ratios 224, 234. The minimum value 244 is multiplied at module 252 by the value of the output 214 from the two-dimensional look-up tables 212 to generate the maximum torque input 141.

Figure 2C:
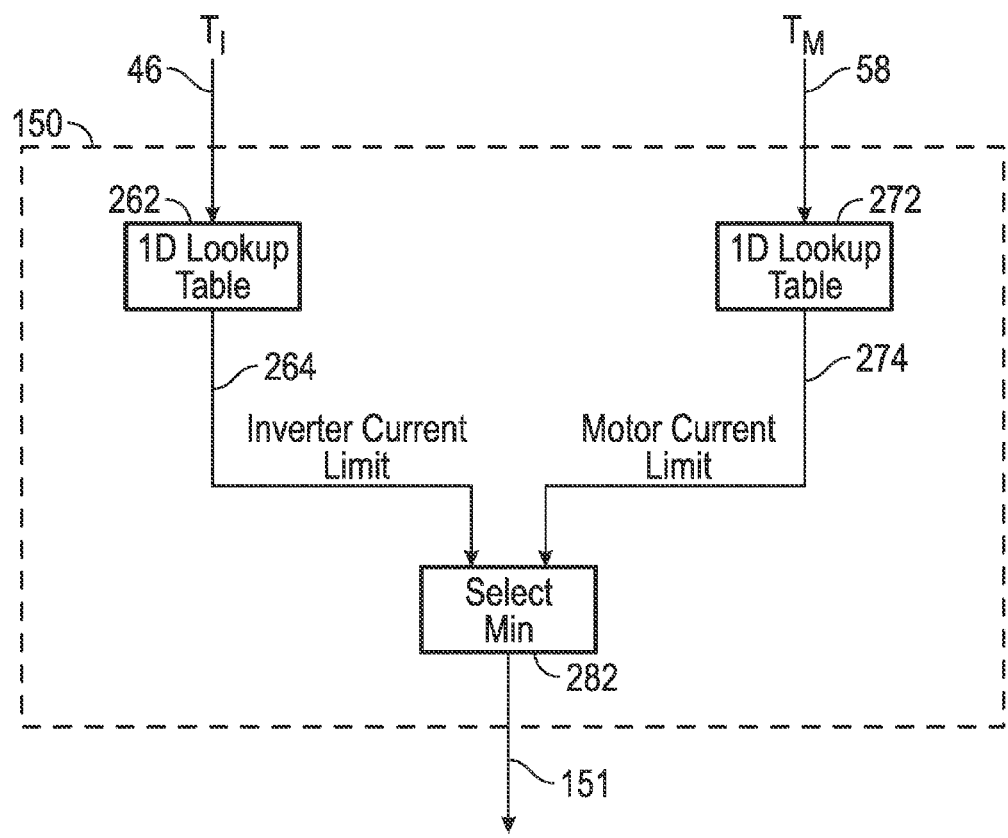
FIG. 2C is a block diagram of a maximum current computation module in accordance with one exemplary implementation of some of the disclosed embodiments.

FIG. 2C is a block diagram of a maximum current computation module 150 in accordance with one exemplary implementation of some of the disclosed embodiments. The maximum current computation module 150 includes two sets of one-dimensional look-up tables 262, 272, and a module 252 that can be used generate the maximum current input 151. As illustrated in FIG. 2C, the inverter temperature ($T_I$) 46 can be an input to a one-dimensional look-up table 262 that outputs an inverter current limit 264, and the machine temperature ($T_M$) 58 can be an input to another one-dimensional look-up table 272 that outputs a machine current limit 274. Module 282 selects and outputs a minimum value of the inverter current limit 264, and the machine current limit 274 that is the maximum current input 151.

Figure 3:
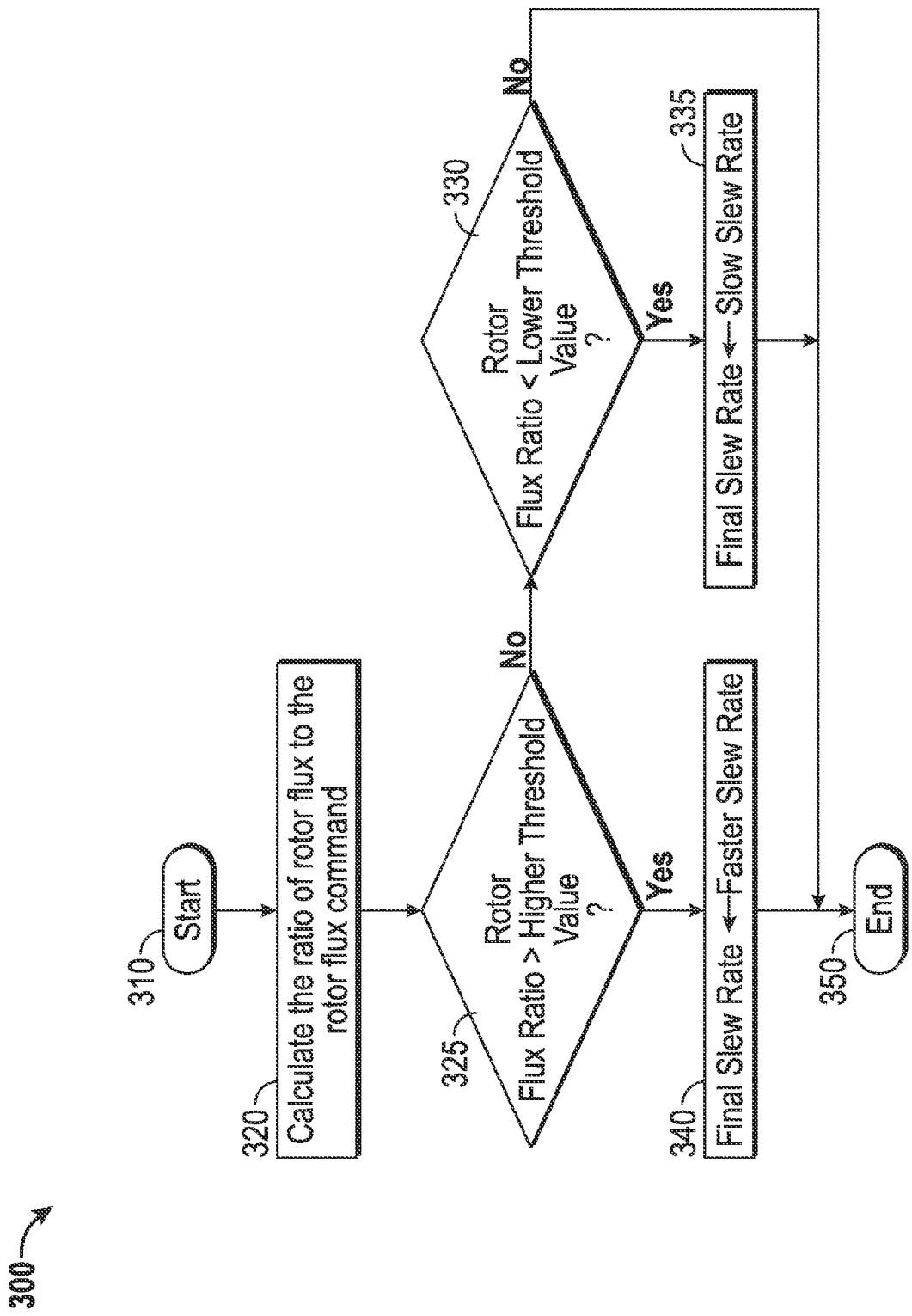
FIG. 3 is a flowchart illustrating a method in accordance with one exemplary implementation of some of the disclosed embodiments.

FIG. 3 is a flowchart illustrating a slew rate control method 300 for setting a slew rate in accordance with one exemplary implementation of some of the disclosed embodiments. Method 300 will be described with reference to FIG. 2A. Depending on the implementation, the method 300 can be used to dynamically adjust the slew rates that are applied at the current slew rate limiter module 146 and/or current slew rate limiter module 162 of FIG. 2A. In one embodiment, the torque and current slew rates have different values, and therefore a separate instance of the method 300 illustrated in FIG. 3 can be performed to dynamically adjust the torque and current slew rates. As such, although FIG. 3 will be described with reference to one non-limiting implementation, in which method 300 is used to dynamically change or adjust only the torque slew rate via control signal 71, it is noted that in some other embodiments, another instance of method 300 can be running in parallel to dynamically change or adjust the current slew rate via control signal 72 such that the controller 70 dynamically adjusts both the torque and current slew rates via control signals 71, 72 independently of each other.

When the controller 70 determines (e.g., based on a parameter value) that slew rate control is to be applied, the method 300 begins at 310, and the controller 70 initially sets the torque slew rate to its slow slew rate value via control signal 71. Likewise, in one embodiment, the controller 70 can also initially set the current slew rate to its slow slew rate value via control signal 72. In either case, the slow slew rates can be determined (e.g., via experimental testing or simulation) such that when the rotor flux is inadequate, the torque/current response does not exhibit significant overshoot and/or oscillation.

At 320, the controller 70 computes a rotor flux ratio of the rotor flux feedback 54 to the rotor flux command 51, and at 325, the controller 70 determines whether the rotor flux ratio is greater than or equal to a high threshold value. The high threshold value will vary depending on the implementation based on factors such as characteristics of the specific inverter 40, characteristics of the specific machine 50, and other control parameters. The high threshold value can be determined via experimental testing or simulations that take into account characteristics of the specific inverter 40, characteristics of the specific machine 50, and other control parameters.

When the controller 70 determines that the rotor flux ratio is greater than (or equal to) the high threshold value, the method 300 proceeds to 340, where the controller 70 sets the torque slew rate to its faster slew rate value via control signal 71 (so that response time can be improved). Likewise, in one embodiment, the controller 70 can also set the current slew rate to its faster slew rate value via control signal 72. After the torque and/or current slew rates are adjusted to their respective faster slew rate values, the method 300 then ends at 350. In either case, the faster slew rates can be determined (e.g., via experimental testing or simulation) so when the rotor flux is adequate, the torque/current response does not exhibit significant overshoot and/or oscillation.

When the controller 70 determines that the rotor flux ratio is not greater than (or equal to) the high threshold value, the method 300 proceeds to 330, where the controller 70 determines whether the rotor flux ratio is less than a low threshold value. Similar to the high threshold value, the low threshold value will vary depending on the implementation based on factors such as characteristics of the specific inverter 40, characteristics of the specific machine 50, and other control parameters. The low threshold value can be determined via experimental testing or simulations that take into account characteristics of the specific inverter 40, characteristics of the specific machine 50, and other control parameters.

When the controller 70 determines that the rotor flux ratio is less than the low threshold value, the method 300 proceeds to 335, where the controller 70 resets the torque slew rate to its slow slew rate value via control signal 71. Likewise, in one embodiment, the controller 70 can also reset the current slew rate to its slow slew rate value via control signal 72. After the torque and/or current slew rates are adjusted to their respective slow slew rate values, the method 300 then ends at 350.

When the controller 70 determines that the rotor flux ratio is not less than the low threshold value, the method 300 ends at 350.

Thus, when the rotor flux feedback is higher than a predetermined value, and slew rate of torque commands (and/or current commands) can be set to relatively high values, and when the rotor flux feedback falls lower than a threshold value, the slew rate of torque commands (and/or current commands) can be reset to relatively low values. This allows the slew rate of the torque commands (and/or the current commands) to be adjusted based on rotor flux to achieve improved torque control (e.g., faster torque response in situations where a fast torque response is desirable without impacting performance of other control parameters such as the transient state oscillation in torque/current responses).

Figure 4:
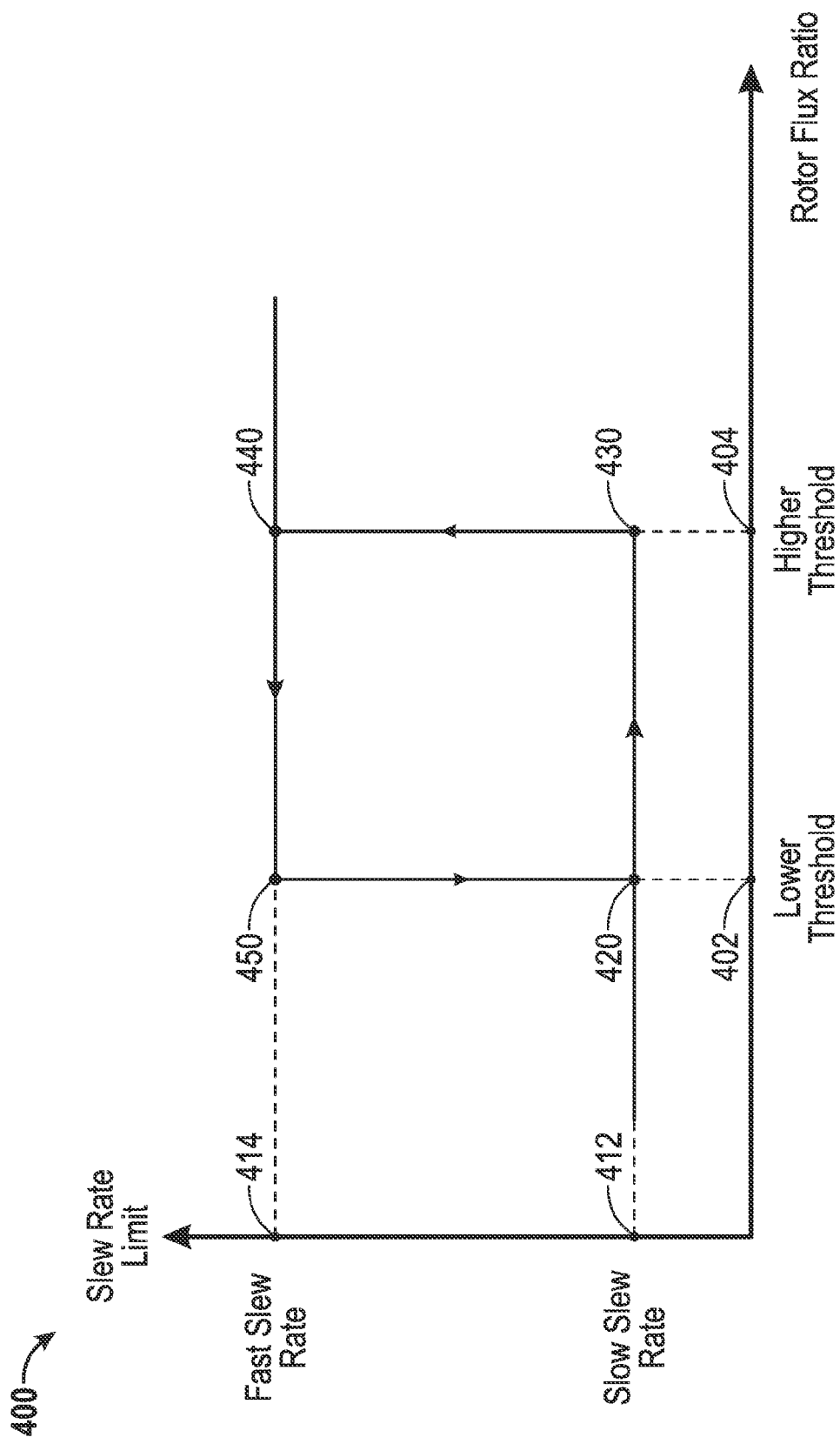
FIG. 4 is a graph that illustrates slew rate as a function of rotor flux ratio in accordance with some of the disclosed embodiments.

FIG. 4 is a graph 400 that illustrates dynamic adjustment of slew rate (y-axis) as a function of rotor flux ratio (x-axis) in accordance with some of the disclosed embodiments. The slew rate illustrated in FIG. 4 can be representative of either the torque or current slew rate that is applied via control signals 71, 72 of FIG. 2A.

In particular, FIG. 4 illustrates a lower threshold value 402, a higher threshold value 404, a slow slew rate value 412, and a fast slew rate value 414. Points 420, 430, 440, 450 represent locations where the slew rate changes based on the rotor flux ratio. For example, the arrow between 440, 450 in FIG. 4 represents that the slew rate is maintained at the fast slew rate value 414 when the rotor flux ratio is between the lower threshold value 402 and the higher threshold value 404. Similarly, the arrow between 420, 430 in FIG. 4 represents that the slew rate is maintained at the slow slew rate value 412 when the rotor flux ratio is between the lower threshold value 402 and the higher threshold value 404. By contrast, the arrow between 430, 440 in FIG. 4 represents the dynamic adjustment of the slew rate from the slow slew rate value 412 and the fast slew rate value 414 when the rotor flux ratio is greater than or equal to the higher threshold value 404. In addition, the arrow between 450, 420 in FIG. 4 represents the dynamic adjustment of the slew rate from the fast slew rate value 414 and slow slew rate value 412 when the rotor flux ratio is less than or equal to the lower threshold value 402.

Figure 5:
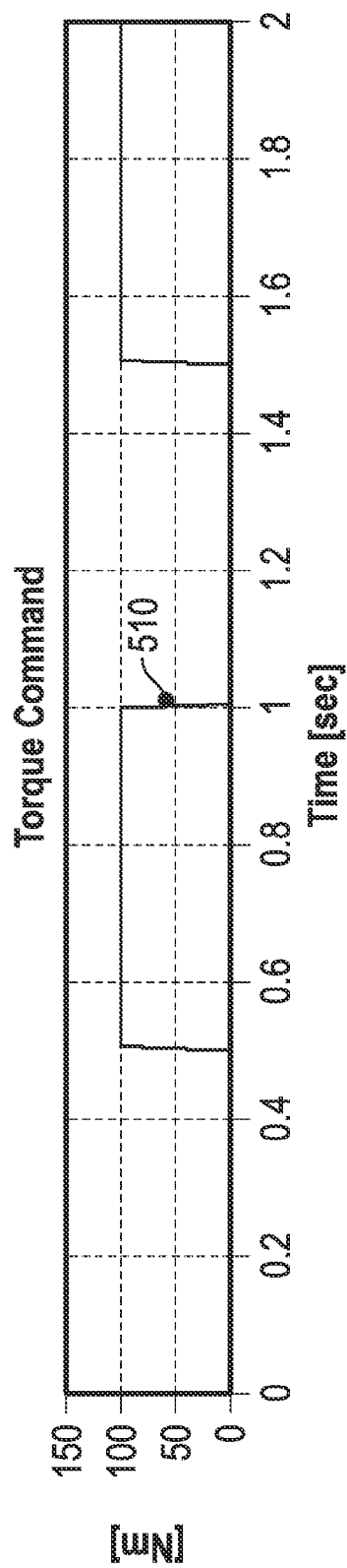
FIG. 5 is a graph that illustrates a torque command as a function of time in accordance with a simulation of one exemplary implementation of some of the disclosed embodiments.
Figure 6:
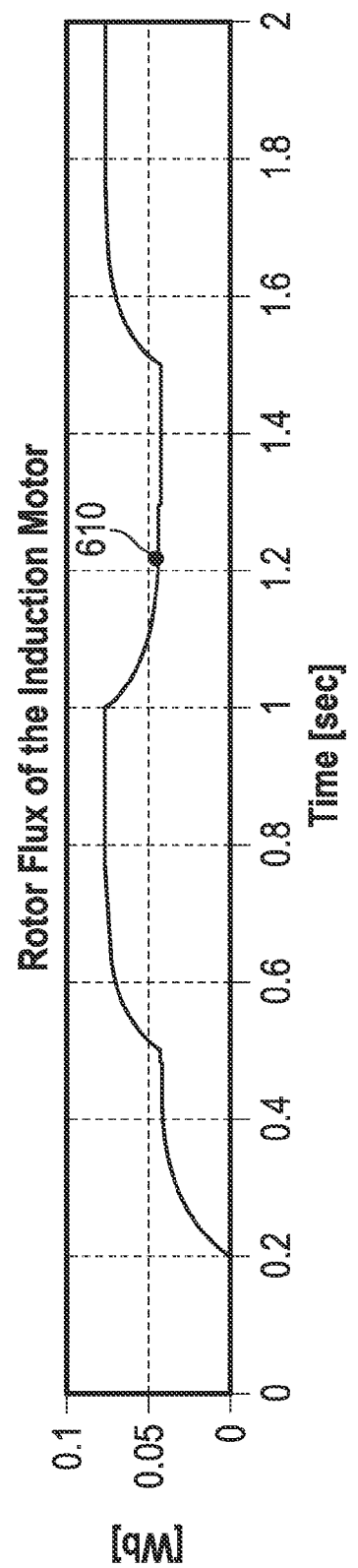
FIG. 6 is a graph that illustrates a rotor flux of an induction machine as a function of time in accordance with a simulation of one exemplary implementation of some of the disclosed embodiments.

FIG. 5 is a graph 510 that illustrates a torque command (N·m) as a function of time (seconds) in accordance with a one exemplary simulation, and FIG. 6 is a graph 610 that illustrates a rotor flux (Weber (Wb)) of an induction machine as a function of time (seconds) in accordance with one exemplary simulation.

Figure 7:
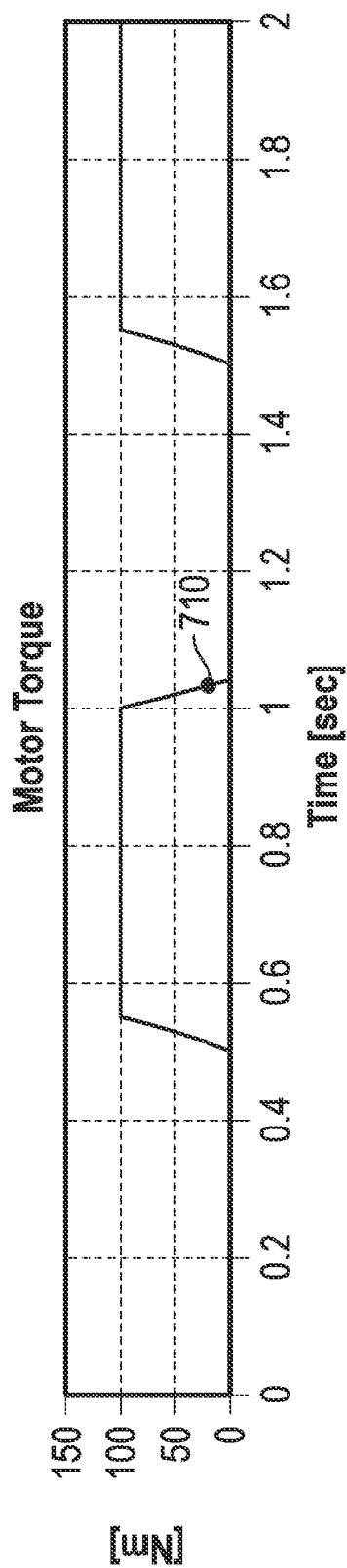
FIG. 7 is a graph that illustrates a torque output by an induction machine as a function of time in accordance with a conventional system.

FIG. 7 is a graph 710 that corresponds to FIGS. 5 and 6, and illustrates a torque output (N·m) by an induction machine as a function of time (seconds) in accordance with a conventional system.

Figure 8:
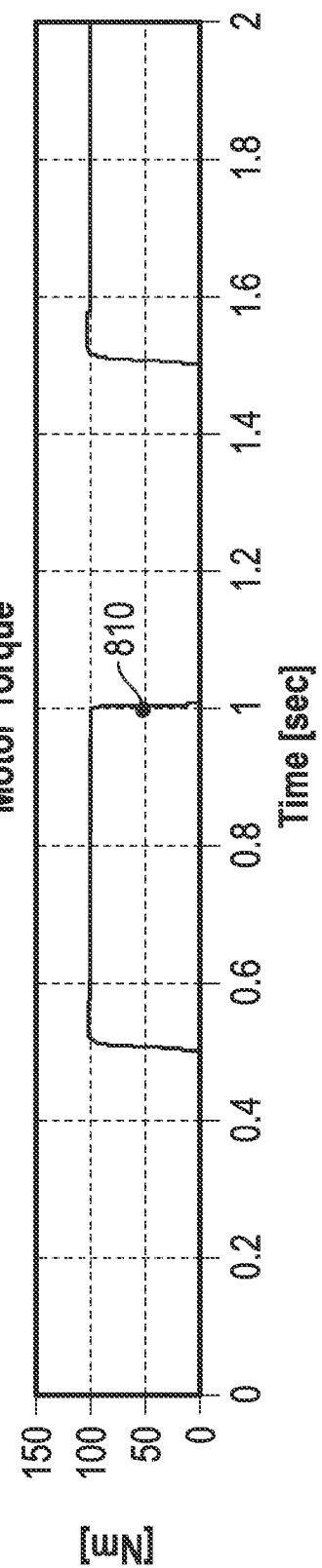
FIG. 8 is a graph that illustrates a torque output by an induction machine as a function of time in accordance with a simulation of one exemplary implementation of some of the disclosed embodiments.

By contrast, FIG. 8 is a graph 810 that also corresponds to FIGS. 5 and 6, and illustrates a torque output (N·m) by an induction machine as a function of time (seconds) when one exemplary implementation of the disclosed embodiments is implemented.

A comparison of FIG. 7 to FIG. 8 clearly illustrates that the torque output (N·m) 810 of the induction machine (that is controlled in accordance with an implementation of the disclosed embodiments) has an improved transition time or faster response.

Thus, by dynamically changing one or more slew rates that are used to generate torque commands and/or current commands, based on rotor flux feedback (e.g., measured or estimated rotor flux), the rate of change of torque commands and/or current commands can be dynamically adjusted so that a fast torque response can be achieved.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the disclosed embodiments as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method performed at a controller for controlling an asynchronous machine, the method comprising:
   determining rotor flux feedback of the asynchronous machine;
   generating, using a value of rotor flux ratio that is a ratio of the rotor flux feedback to a rotor flux command:
      a first control signal that dynamically adjusts a torque slew rate of a torque command by initially setting the torque slew rate to a slow torque slew rate value via the first control signal and, when the value of the rotor flux ratio is determined to be greater than or equal to the high threshold value, setting the torque slew rate to a faster torque slew rate value via the first control signal, and
      a second control signal that dynamically adjusts a current slew rate of final current commands independently of the torque slew rate such that the torque and current slew rates have different values; and
   processing the final current commands to generate current signals that control the asynchronous machine.

2. A method according to claim 1, wherein the generating the first control signal, comprises:
   computing the value of the rotor flux ratio that is a ratio of the rotor flux feedback to the rotor flux command;
   determining whether the value of the rotor flux ratio is greater than a high threshold value;
   when the value of the rotor flux ratio is determined to be less than the high threshold value, determining whether the value of the rotor flux ratio is less than a low threshold value; and
   when the value of the rotor flux ratio is determined to be less than the low threshold value, setting the torque slew rate to the slow torque slew rate value via the first control signal.

3. A method according to claim 2, wherein the rotor flux command is determined from a lookup table that maps torque command values to corresponding rotor flux command values.

4. A method according to claim 3, wherein the rotor flux feedback is measured using a flux sensor.

5. A method according to claim 2, wherein the rotor flux feedback is either a d-axis rotor flux or a magnitude of the rotor flux feedback.

6. A method according to claim 3, wherein the rotor flux feedback is estimated using a flux estimator module.

7. A method according to claim 1, wherein generating the second control signal, comprises:
   initially setting the current slew rate to a slow current slew rate value via the second control signal;
   computing the value of the rotor flux ratio that is a ratio of the rotor flux feedback to the rotor flux command;
   determining whether the value of the rotor flux ratio is greater than another high threshold value;
   when the value of the rotor flux ratio is determined to be greater than or equal to the other high threshold value, setting the current slew rate to a faster current slew rate value via the second control signal;
   when the value of the rotor flux ratio is determined to be less than the other high threshold value, determining whether the value of the rotor flux ratio is less than another low threshold value; and
   when the value of the rotor flux ratio is determined to be less than the other low threshold value, setting the current slew rate to the slow current slew rate value via the second control signal.

8. A method according to claim 1, wherein the method further comprises:
   processing a torque command input signal and outputting a limited torque command; and generating a limited torque command output signal based on the first control signal and the limited torque command, wherein the torque slew rate of the limited torque command output signal is adjusted based on the first control signal;
   generating limited current commands; and
   generating the final current commands based on the second control signal and the limited current commands, wherein the current slew rate of the final current commands is adjusted based on the second control signal.

9. A system for controlling an asynchronous machine, comprising:
   a torque-to-current mapping module that is configured to generate final current commands; and
   a controller that is configured to:
   generate, based on using a value of rotor flux ratio that is a ratio of a rotor flux feedback of the asynchronous machine to a rotor flux command, a first control signal that dynamically adjusts a torque slew rate of a torque command;
   initially set the torque slew rate to a slow torque slew rate value via the first control signal, and
   set the torque slew rate to a faster torque slew rate value via the first control signal when the value of the rotor flux ratio is determined to be greater than or equal to the high threshold value, and
   a second control signal that dynamically adjusts a current slew rate of the final current commands independently of the torque slew rate such that the torque and current slew rates have different values, wherein the final current commands are used to generate current signals that control the asynchronous machine.

10. A system according to claim 9, wherein the controller is configured to generate the control signals by comparing a value of the rotor flux ratio to one or more thresholds, wherein the rotor flux ratio is computed based on the rotor flux command and the rotor flux feedback.

11. A system according to claim 10, wherein the controller is configured to:

compute the value of the rotor flux ratio that is a ratio of the rotor flux feedback to the rotor flux command;

determine whether the value of the rotor flux ratio is greater than a high threshold value;

determine whether the value of the rotor flux ratio is less than a low threshold value when the value of the rotor flux ratio is determined to be less than the high threshold value;

set the torque slew rate to a slower torque slew rate value via the first control signal when the value of the rotor flux ratio is determined to be less than the low threshold value.

12. A system according to claim 10, wherein the controller is configured to:

initially set the current slew rate to a slow current slew rate value via the second control signal;

compute the value of the rotor flux ratio that is the ratio of the rotor flux feedback to the rotor flux command;

determine whether the value of the rotor flux ratio is greater than another high threshold value;

set the current slew rate to a faster current slew rate value via the second control signal when the value of the rotor flux ratio is determined to be greater than or equal to the other high threshold value;

determine whether the value of the rotor flux ratio is less than another low threshold value when the value of the rotor flux ratio is determined to be less than the other high threshold value; and set the current slew rate to a slower current slew rate value via the second control signal when the value of the rotor flux ratio is determined to be less than the other low threshold value.

13. A system according to claim 10, wherein the rotor flux command is determined from a lookup table that maps torque command values to corresponding rotor flux command values.

14. A system according to claim 13, wherein the rotor flux feedback is either measured using a flux sensor, or estimated using a flux estimator module.

15. A system according to claim 10, wherein the rotor flux feedback is either a d-axis rotor flux or a magnitude of the rotor flux feedback.

16. A system according to claim 10, further comprising:

a torque slew rate limiter module; and wherein the torque-to-current mapping module comprises:

a current slew rate limiter module, and wherein the rotor flux ratio is used to dynamically adjust at least one of:

the first control signal that controls the torque slew rate that is applied at the torque slew rate limiter module to adjust the torque slew rate that is applied to the torque command at the torque slew rate limiter module, or the second control signal that controls the current slew rate that is applied at the current slew rate limiter module to adjust the current slew rate that is applied to final current commands at the current slew rate limiter module.

17. A system according to claim 16, wherein the torque-to-current mapping module comprises:

a current command computation module that is configured to generate initial current commands based on inputs comprising: a limited torque command output signal, a DC input voltage, and an angular rotation speed;

a maximum current computation module that is configured to generate maximum current inputs based on synchronous reference frame current signals, wherein the maximum current inputs represent maximum current values that are permitted; and a maximum current limiter module that is configured to generate limited current commands based on the maximum current input and the initial current commands, and when the initial current commands exceed the maximum current inputs, wherein the maximum current limiter module limits the values of the limited current commands to values of the maximum current inputs, and when the initial current commands are less than or equal to the maximum current inputs, wherein the limited current commands are the initial current commands, and wherein the current slew rate limiter module is configured to generate the final current commands based on the second control signal and the limited current commands, wherein the current slew rate limiter module is configured to dynamically adjust the current slew rate of the final current commands based on the second control signal.

18. A system according to claim 17, wherein the system further comprises:

a torque limiter module, comprising:

a maximum torque limiter module that is configured to output a limited torque command; and wherein the torque slew rate limiter module is configured to process the first control signal and the limited torque command to generate a limited torque command output signal such that the torque slew rate of the limited torque command output signal is adjusted based on the first control signal.

* * * * *